United States Patent Office 3,543,381
Patented Dec. 1, 1970

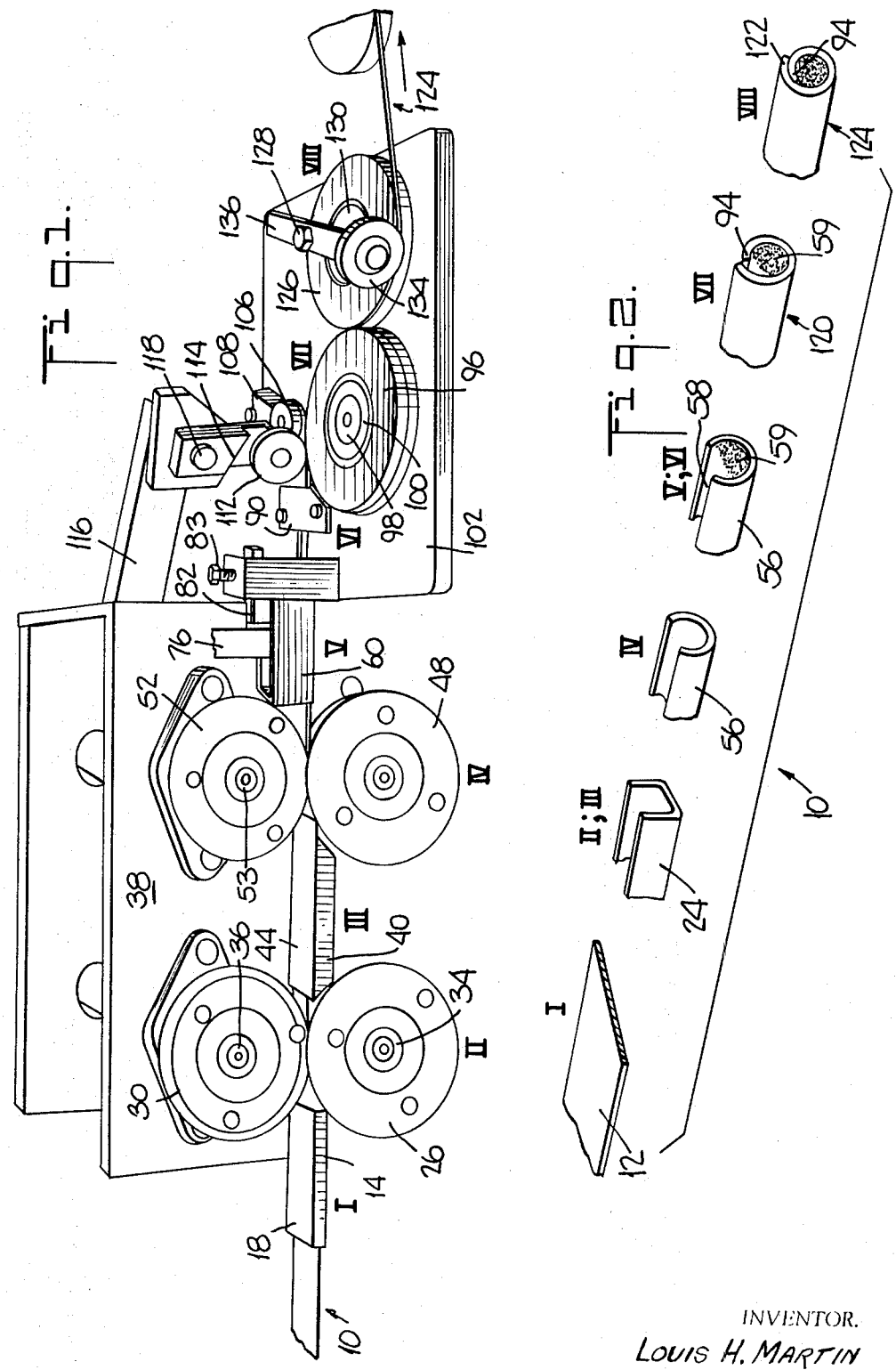

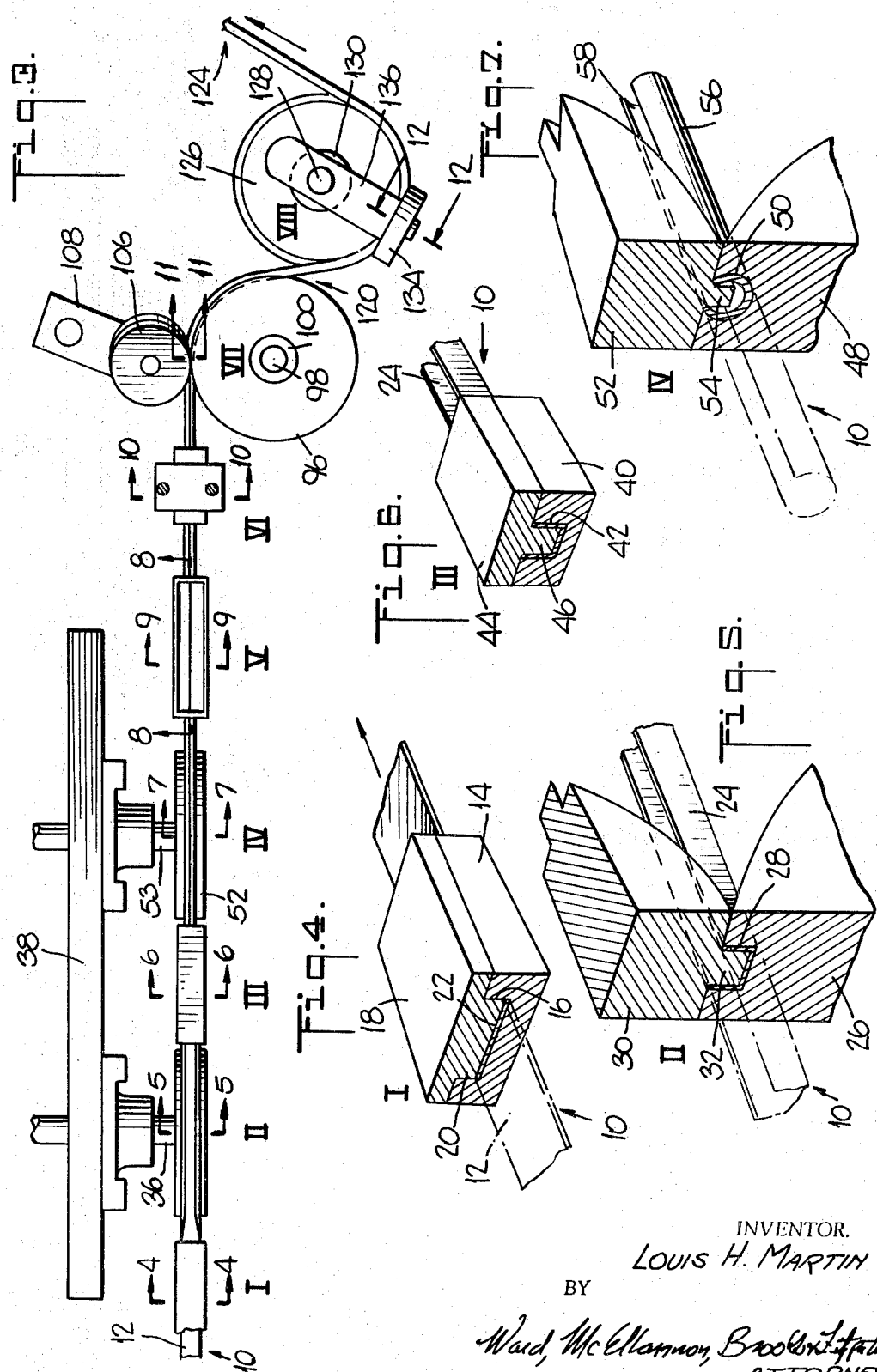

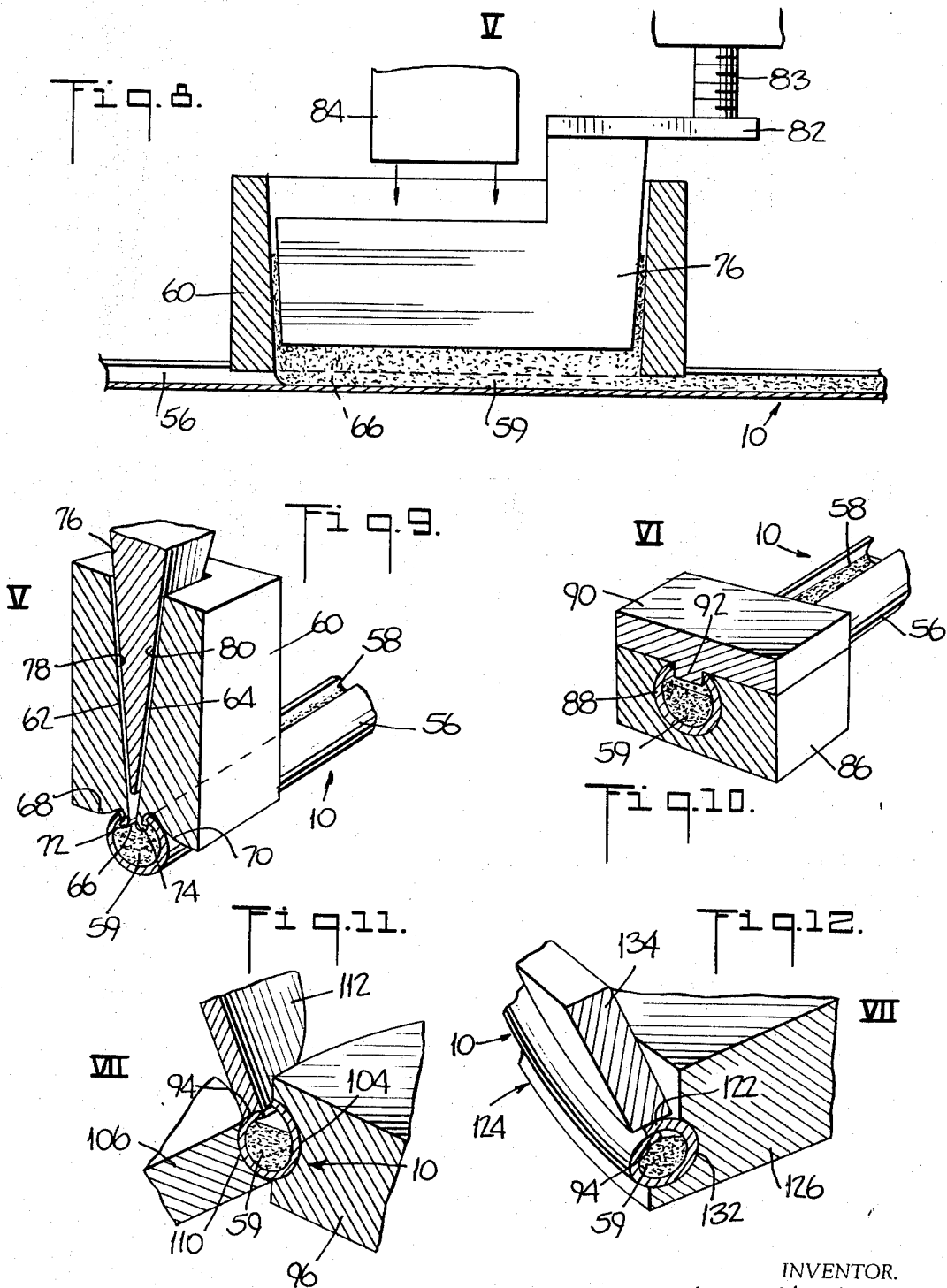

3,543,381
METHOD AND APPARATUS FOR MAKING A FILLED TUBULAR PRODUCT
Louis H. Martin, Kenilworth, N.J., assignor to Astor Manufacturing Co., Inc., South Plainfield, N.J., a corporation of New Jersey
Filed Mar. 6, 1968, Ser. No. 710,980
Int. Cl. B23p *19/00, 19/04;* B22f *3/24*
U.S. Cl. 29—429                              24 Claims

ABSTRACT OF THE DISCLOSURE

Method and apparatus for making a filled tubular product including forming a channel shaped tube with an upper longitudinally extending top slot, depositing a filling material inside the so formed tube, and thence passing the so filled channel shaped tube between roll means for folding over the side edges thereof to form an overlapping edge seam, and interposing a guide station between forming stations to prevent the strip from curling or being deformed while approaching the next station.

---

This invention has to do with filled tubular products and more particularly to a new and improved method and apparatus for fabricating such products. Among many possible uses, filled tubular products constructed in accordance with the teachings of this invention are particularly adapted for use as welding rods, for example. Heretofore, attempts have been made to fabricate such products, but these attempts have not been entirely satisfactory for a number of different reasons. Prior art fabricating techniques required large complicated machines which operated at slow speeds. An object of this invention is to overcome these prior art difficulties.

Briefly, my invention contemplates the provision of apparatus for fabricating filled tubular products embodying a series of forming and retaining stations which continuously receive and process a flat strip of material. Longitudinal tension is applied to the strip subsequent to the series of stations for drawing or pulling the strip therethrough. The first station is a retaining station which is arranged to receive the strip and retain it in a flattened condition. In one form of the invention, the retaining means includes a lower channel shaped flat guide and an upper mating plug which coact to hold the strip flat against the bottom of the channel guide. Inasmuch as there is longitudinal tension applied to the strip, this retaining or guide means serves to prevent the strip from curling or being deformed while approaching the next station.

The next, or second, station, includes a pair of mating channel forming rollers which serve to bend upwardly the side edges of the strip, thereby shaping the strip into a generally U-shaped channel. According to one embodiment of the invention, the lower roll is provided with a channel extending completely around the periphery thereof, and the upper roll is provided with a mating bead or projection extending around its periphery. In operation, the strip is passed between the two rolls and is thereby formed into a channel shaped configuration.

From the second station the strip passes to a third or retaining station wherein the strip is retained in its channel shape. In one form of the invention, this station comprises a lower channel shaped flat guide sized to receive the channel shaped strip, and an upper mating plug which coacts to retain the channel in the lower guide. This retaining means also serves to prevent the strip from twisting or being deformed while approaching the next station.

The next station is a fourth or forming station whereby in the strip is passed between a pair of mating rolls which tend to round up the sides of the strip so as to form a partial tube with a longitudinally extending top slot. The lower roll may be provided with a peripherally extending rounded groove and the upper roll with a peripherally extending mating bead or projection which fits down into the top slot as the strip passes between the rolls, thereby preparing the strip for the next station.

In the fifth station, there is arranged a feed mechanism which feeds material or powdered filler into the so rounded trough-like strip as it passes therethrough. In one form of the invention, the feeding mechanism comprises an elongated longitudinally extending chute. The chute has downwardly, inwardly tapered side walls forming a narrow slot or discharge orifice. A wedge shaped gate is vertically adjustable within said chute to regulate the flow of filling material through the discharge orifice, as desired.

The so filled rounded channel shaped strip thence passes to the sixth station which is another retaining station. In this station the strip is prevented from turning, twisting, or deforming. In one embodiment of the invention, a lower rounded channel shaped flat guide is sized to receive the strip, and an upper mating plug fits down into the top slot, thereby retaining the strip with the filler material therein.

The seventh station serves to fold over one of the side edges of the strip. That is, the strip is passed between a pair of mating rolls, while a third or folding roll engages the side edge of the strip to fold it over. The strip passes partially around one of the mating rolls a distance sufficient to pull together the side edges of the partial tube, and then passes to the next station.

In the last, or eighth station, the strip passes between another pair of rolls, one being angularly disposed to fold over the remaining side edge of the strip, thereby forming a closed tube containing said filler. According to my invention, the closure seam may be either a butt seam or a lapped seam, as desired. The so filled tubular product is then carried away.

There has thus been outlined rather broadly the more important features of the invention in order that the detailed description thereof that follows may be better understood, and in order that the present contribution to the art may be better appreciated. There are, of course, additional features of the invention that will be described hereinafter which will form the subject of the claims appended hereto. Those skilled in the art will appreciate that the conception on which this disclosure is based may readily be utilized as the basis for the design of other structures for carrying out the several purposes of the invention. It is important, therefore, that the claims be regarded as including such equivalent constructions as do not depart from the spirit and scope of the invention.

One embodiment of the invention has been chosen for purposes of illustration and description, and is shown in the accompanying drawings, forming a part of the specification, wherein:

FIG. 1 is a perspective view of apparatus for making a filled tubular product according to the concept of this invention;

FIG. 2 is a series of perspective views of the strip illustrating the steps involved in forming the tubular products;

FIG. 3 is a plan view of the apparatus of FIG. 1;

FIG. 4 is an enlarged perspective view of the portion of the machine indicated by the lines 4—4 in FIG. 3, and showing the station designated as I in FIG. 1;

FIG. 5 is an enlarged perspective view of the portion of the machine indicated by the lines 5—5 in FIG. 3, and showing the station designated as II in FIG. 1;

FIG. 6 is also an enlarged perspective view of the portion of the machine indicated by the lines 6—6 in FIG. 3, and showing the station designated as III in FIG. 1;

FIG. 7 is an enlarged perspective view of the portion of the machine indicated by the line 7—7 in FIG. 3, and showing the station designated as IV in FIG. 1;

FIG. 8 is an enlarged longitudinal sectional view taken substantially along the line 8—8 in FIG. 3;

FIGS. 9, 10, 11 and 12 are enlarged perspective views of portions of the machine indicated by the lines 9—9, 10—10, 11—11 and 12—12, respectively, in FIG. 3 and showing the stations designated as V, VI, VII and VIII in FIG. 1.

In the illustrated embodiment of my invention the tubular product being formed is a welding rod and the filler material is a powdered welding flux. The apparatus comprises a series of stations designated by the Roman numerals I through VIII, inc. Each station performs one or more operations on the metal strip as the strip passes thereby. Longitudinal tension is applied to the strip subsequently to the series of stations for drawing or pulling the strip through the apparatus. The strip, indicated generally at 10, is received in a flattened condition from a supply source, not shown, and passes to the first station I. This station serves to retain the strip in its flattened condition as at 12, FIGS. 2 and 4. This is effected by means of a lower flat guide 14, having an upper channel shaped opening 16, and an upper mating guide 18 having a depending plug portion 20 which coact to hold the strip therebetween as at 22. These guides serve to retain the strip in its flattened condition as well as removing any irregularities or imperfections in the strip, as received from the supply source. Thence, the strip passes to the second station II, wherein, as best seen in FIG. 5, the strip is formed into a generally U-shaped channel, as at 24. This station includes a lower roller 26 having a U-shaped peripheral channel 28, which is slightly narrower than the width of the flattened strip 12. An upper mating roll 30 has a bead or depending projection 32 which meshes with the channel of the lower roll to bend the sides of the strip upwardly, thereby forming the aforesaid U-shaped channel, as at 24. The rollers 26 and 30 are carried by shafts 34 and 36, respectively, FIG. 3. Both of these shafts are mounted on a frame 38 provided for the purpose.

As best seen in FIG. 6, the third station III is a retaining station wherein the strip is retained in its generally U-shaped channel configuration, as at 24. This is effected by means of a lower flat guide 40 having a channel-like opening 42 which is sized to receive the strip therein. An upper mating guide 44 has a plug portion 46 which fits into the channel to retain the strip between the two guides, thereby preventing twisting or the like between the second and fourth stations.

Thence, the strip passes to the fourth station IV which is best seen in FIG. 7. In this station the strip is passed between a lower roll 48 having a semicircular opening 50 extending around the periphery thereof, and an upper roll 52 having a mating bead or projection 54 extending around its periphery. As seen in FIG. 1, rolls 48 and 52 are mounted on shafts 49 and 53, respectively. These shafts are carried by frame 38. As the strip passes between rolls 48 and 52, the sides are rounded upwardly forming a partial tube, as at 56, with a longitudinally extending top slot 58. The strip, as illustrated at 56, is now ready to pass to the next station.

Referring to FIGS. 8 and 9, the fifth station V embodies a feeding mechanism which feeds material or powdered filler 59 into the so rounded trough shaped strip. The feeding mechanism comprises an elongated longitudinally extending chute 60 having downwardly, inwardly tapered side walls 62 and 64 which form a narrow slot-like discharge orifice 66 at the base thereof. As best seen in FIG. 9, the bottom of the side walls 62 and 64 are provided with recess portions 68 and 70, respectively, adjacent the discharge orifice 66 to form curled lip-like edges 72 and 74, respectively, for permitting the discharge orifice 66 to be positioned within the top slot 58 of the trough shaped strip 56. The recesses and lip-like edges prevent spillage of the powdered welding flux during the filling operation, as well as substantially reducing the escape of powdered dust. The latter is particularly important when handling certain deleterious filler materials. In order to control the flow of filter material 59 through the discharge orifice 66, a gate 76 having tapered side walls 78 and 80 is mounted within the chute 60, the side walls 78 and 80 being substantially parallel to the respective side walls 62 and 64 of the chute. The vertical elevation of the gate, and hence the flow control of the filler material, is provided by the control arm 82 and set screw 83, FIGS. 1 and 8, provided for the purpose. The chute 60 is filled from a supply hopper 84 disposed thereabove.

Then, the filled strip passes to the sixth station VI, as best seen in FIG. 10. This station is a retaining station comprising a lower flat guide 86 which is provided with a rounded channel-like opening 88 for receiving the trough shaped strip 56. An upper mating guide 90 has a plug portion 92 which fits into the top slot 58. The upper and lower guides serve to prevent the strip from twisting, turning or being deformed as it passes to the next station.

The next station is the seventh station VII which is best seen in FIGS. 1, 3 and 11. Station seven serves to fold over one of the side edges 94 of the strip. This station includes a substantially horizontally disposed relatively large backup roll 96 which is mounted on shaft 98, FIG. 3, by means of bearings 100, shaft 98 being mounted on support member 102, FIG. 1. As best seen in FIG. 11, roll 96 is provided with a rounded groove 104 extending around the periphery thereof for receiving the filled, rounded strips therein. A holding roll 106 is rotatably mounted on bracket 108, FIGS. 1 and 3 which, in turn, is mounted on support member 102, FIG. 1. Holding roll 106 is also provided with a rounded groove 110, FIG. 11, extending around the periphery thereof for receiving the rounded strip therein. A folding roll 112 is rotatably mounted on bracket 114, FIG. 1, which, in turn, is adjustably mounted on frame portion 116, as by adjusting screw 118. Preferably, the folding roll is disposed at an angle with respect to the backup roll as well as at an angle of the order of about 35 degrees with respect to the strip. As best seen in FIG. 11, the folding roll 112 serves to fold over the side edges 94 of the strip. The strip, with one side edge folded over as it leaves station VII, has the appearance as indicated at 120, FIG. 2. As seen in FIG. 3, the strip leaves the backup roll 96 after travelling a distance therearound sufficient to pull together the side edges of the partial tube. Preferably such distance is of the order of about 90 degrees.

The last, or eighth station VIII is shown in FIGS. 1, 3 and 12. In this station the other side edge 122 of the strip is folded over the side edge 94 to complete the lapped closure seam, thereby forming a tube as indicated at 124, FIG. 2. This station includes a backup roll 126, which is substantially the same diameter as backup roll 96 described hereinbefore in connection with station six. Backup roll 126 is mounted on shaft-bolt 128, FIGS. 1 and 3, as by means of bearings 132, shaft-bolt 128 being mounted on support member 102, FIG. 1. The backup roll 126 is provided with a rounded grove 132, FIG. 12, extending around the periphery thereof for receiving the rounded strip therein. A folding roll 134 is rotatably mounted on bracket 136, FIGS. 1 and 3, which is adjustably carried by the shaft-bolt 128. As best seen in FIG. 12, the folding roll 134 is so disposed that the periphery thereof engages the side edge 122 of the strip to fold it over, and thereby completing the lapped closure seam. Also, according to this invention, the closure seam may be a butt seam, if desired. Referring to FIG. 3, it will be seen that the backup roll 126 is disposed in spaced relationship with respect to the backup roll 96 and oriented so that the strip 120 passes preferably about 90 degrees around the roll 96 before engaging the roll 126. This serves to bring the side edges 94 and 122 toward each other, and thereby close the gap therebetween. The edges are brought together a distance sufficient to form either a butt seam or a lapped seam. Preferably, the strip passes about 90 degrees around the roll 126 before engaging the fold roll 134, and then continuous about 90 degrees more before leaving the apparatus.

It will thus be seen that the present invention does indeed provide an improved method and apparatus for making a filled tubular product which is superior in simplicity, economy and efficiency as compared to prior art such devices.

Although a certain particular embodiment of the invention was herein disclosed for purposes of explanation, various modifications thereof, after study of this specification, will be apparent to those skilled in the art to which the invention pertains, and reference should accordingly be had to the appended claims in determining the scope of the invention.

What is claimed and desired to be secured by Letters Patent is:

1. A method of making a filled tubular product comprising the steps of forming a channel shaped partial tube with an upper longitudinally extending top slot, passing said partial tube through a guide station wherein it is retained in its channel shape, depositing a filler material inside said partial tube, passing said partial tube between a pair of mating rolls while a third angularly disposed roll folds over one of the side edges of said partial tube, carrying said partial tube around one roll of said pair of mating rolls a sufficient distance to pull together the side edges of said partial tube, and thence passing said partial tube between a second pair of mating rolls, one roll of said second pair being angularly disposed and serving to fold over the other side edge to form a closure seam.

2. A method of making a filled tubular product comprising the steps of receiving a flat shaped strip, sliding said strip through a guiding station wherein said strip is retained in a flattened condition, passing said strip between a pair of mating channel forming rolls to bend upwardly the side edges thereof to form a generally U-shaped channel, sliding said U-shaped channel through a guide station wherein it is retained in its generally U-shape, passing said U-shaped channel between a pair of mating rollers to round up the sides thereof into a partial round tube with a longitudinally extending top slot, depositing filling material inside said partial tube, sliding said partial tube with filling material through a rounded lower guide and a mating upper guide having a depending projection which extends down into said longitudinally extending top slot, and passing said partial tube between roll means for folding over the side edges thereof to form a closure seam.

3. A method of making a filled tubular product comprising the steps of receiving a flat strip, sliding said strip through a flat guiding station wherein said strip is retained in its flattened condition, passing said strip between a pair of mating channel forming rolls to bend upwardly the side edges thereof to form a generally U-shaped channel, sliding said U-shaped channel through a guide station wherein said strip is retained in its U-shaped, passing said U-shaped channel between a pair of mating rounding rolls to round up the sides thereof into a partial round tube with a longitudinally extending top slot, depositing a filling material inside said partial tube, sliding said partial tube and filling material through a rounded shaped lower guide and a mating upper guide having a depending projection which extends down into said longitudinally extending top slot, passing said partial tube between a pair of mating rolls while a third angularly disposed roll folds over one of the side edges of said partial tube, and passing said partial tube between another pair of mating rolls, one being angularly disposed to fold over the other side edge of said partial tube to form a closure seam.

4. Apparatus for making a filled tubular product comprising a series of forming and retaining stations which continuously receive and process a flat strip of material, the first station including means for receiving and retaining said strip in flattened condition; the second station including roll means for bending upwardly the side edges of said strip to form a U-shaped channel; the third station including means for retaining said strip in the shape of the U-shaped channel; the fourth station including roll means for rounding up the sides of the U-shaped channel into a partial round tube with a longitudinally extending top slot; the fifth station including filling means for filling material inside said partial tube; the sixth station including means for retaining said partial tube and filling material from turning, twisting or deforming; and a station including roll means for folding over the side edges of the partial tube to form a closure seam.

5. Apparatus for making a filled tubular product according to claim 4 wherein said last named station comprises a pair of mating rolls for receiving said strip therebetween and a third angularly disposed roll for folding over one of the side edges of said partial roll, another pair of mating rolls one of which serving to fold over the other side edge of said partial roll to form a closure seam.

6. Apparatus for making a filled tubular product according to claim 4 wherein said first station comprises a lower flat guide having an upper channel shaped opening, an upper mating guide having a depending plug portion coacting with said lower guide to hold the strip therebetween.

7. Apparatus for making a filled tubular product according to claim 4 wherein said second station comprises a lower roll having a U-shaped peripherally extending channel which is slightly narrower than the width of the flattened strip, an upper mating roll having a downwardly extending projection which registers with the channel of the lower roll to bend the sides of the strip upwardly therebetween to form the strip into a U-shaped channel.

8. Apparatus for making a filled tubular product according to claim 4 wherein said third station comprises a lower flat stationary guide provided with a channel-like opening which is sized to receive the U-shaped channel therein, an upper mating guide having a plug portion which registers with said channel to retain said channel therebetween.

9. Apparatus for making a filled tubular product according to claim 4 wherein said fourth station comprises a lower roll having a rounded groove extending around the periphery thereof, and an upper roll having a mating projection extending around its periphery thereby rounding up the sides of said U-shaped channel as it passes between said rolls to form a partial round tube with a longitudinally extending top slot.

10. Apparatus for making a filled tubular product according to claim 4 wherein said fifth station comprises an elongated longitudinally extending chute having downwardly, inwardly tapered sidewalls forming a narrow slot-like discharge orifice at the base thereof, the bottom of the side walls being provided with recess portions forming cured lip-like edges for discharging filler material into said longitudinally extending top slot.

11. Apparatus for making a filled tubular product according to claim 4 wherein said sixth station comprises a lower flat stationary guide which is provided with a rounded channel-like opening for receiving the partial rounded tube and filler materials, an upper stationary mating guide having a plug portion which registers with said longitudinally extending top slot, said guides coacting to prevent the partial tube from twisting, turning or being deformed as it passes through the station.

12. Apparatus for making a filled tubular product according to claim 4 wherein said last station includes a seventh station which comprises a substantially horizontally disposed relatively large backup roll having a rounded groove extending around the periphery thereof for receiving the partial rounded tube therein, a holding roll having a rounded groove extending around the periphery thereof for receiving the partial rounded tube therein, a folding roll angularly disposed with respect to the partial tube to fold over the side edge thereof.

13. Apparatus for making a filled tubular product according to claim 4 wherein said last station includes an eighth station which comprises a backup roll having a relatively large diameter and having a rounded groove extending around the periphery thereof for receiving the partial rounded tube therein, a fold roll so disposed that the periphery thereof engages the side edge of the tube to fold it over and thereby form a closure seam.

14. Apparatus for making a filled tubular product comprising a series of forming and retaining stations which continuously receive and process a strip of material, filling means for feeding filler material into a trough shaped strip having a longitudinally extending top slot, said filling means comprising an elongated longitudinally extending chute having downwardly, inwardly tapered side walls which form a narrow slot-like discharge orifice at the base thereof, and means for controlling the flow of filler material through said discharge orifice.

15. Apparatus for making a filled tubular product according to claim 14 wherein said means for controlling the flow of filler material through said discharge orifice comprises a gate having tapered side walls mounted within said chute, the side walls of said gate being substantially parallel to the side walls of said chute, and means for vertically adjusting the position of said gate with respect to said discharge orifice, thereby to throttle the flow of filler material through said discharge orifice.

16. Apparatus for filling tubular products according to claim 14 wherein the bottom of the side walls of said chute are provided with recess portions adjacent said discharge orifice to facilitate the flow of filler material through said discharge orifice and into said longitudinally extending top slot.

17. Apparatus for making a filled tubular product according to claim 16 wherein the edges of said discharge orifice are lip-like portions which curl up and away from the opening thereby preventing blow-back of the filler material being discharged into the trough shaped strip.

18. Apparatus for making a filler tubular product comprising a series of forming and retaining stations which continuously receive and process a strip of material, filling means for feeding filler material into a trough shaped strip having a longitudinally extending top slot, said filling means comprising an elongated longitudinally extending chute having downwardly, inwardly tapered side walls which form a narrow slot-like discharge orifice at the base thereof, the bottom of said side walls of said chute being provided with recess portions adjacent said discharge orifice, the edges of said discharge orifice having lip-like portions which curl up and away from the opening thereby facilitating the flow of filling material through said discharge orifice and into said longitudinally extending top slot and preventing blow-back of the filler material being discharged into said partial tube, a gate having tapered side walls mounted within said chute, the side walls of said gate being substantially parallel to the side walls of said chute, and means for vertically adjusting the position of said gate with respect to said discharge orifice thereby to throttle the flow of filler material through said discharge orifice.

19. Apparatus for making a filled tubular product comprising a series of forming and retaining stations which continuously receive and process a strip of material, means for folding over the side edges of said strip to form a closure seam comprising a backup roll having a groove extending around the periphery thereof, a holding roll having a groove extending around the periphery thereof, said holding roll being disposed adjacent said backup roll for receiving said strip therebetween, a folding roll disposed adjacent said backup roll and said holding roll to fold over one side edge of said strip.

20. Apparatus for making a filled tubular product according to claim 19 wherein said folding roll is angularly disposed with respect to said backup roll, and wherein said folding roll is disposed at an angle of about 35 degrees with respect to longitudinal axis of the strip.

21. Apparatus for making a filled tubular product according to claim 19 further comprising a second backup roll and a second folding roll for receiving said strip therebetween to fold over the other side edge of said strip to form a closure seam.

22. Apparatus for making a filled tubular product according to claim 21 wherein said second backup roll is offset and rotates in the opposite direction with respect to said first backup roll whereby said strip passes around said first backup roll a distance sufficient to close the side edges of said strip prior to engagement with said second backup roll, and thence passes partially around said second backup roll prior to disengagement therewith.

23. Apparatus for making a filled tubular product according to claim 22 wherein said strip passes about 90 degrees around said first backup roll prior to engagement with said second backup roll.

24. Apparatus for making a filled tubular product comprising a series of forming and retaining stations which continuously receive and process a strip of material, means for folding over the side edges of said strip to form a closure seam comprising a substantially horizontally disposed relatively large backup roll having a rounded groove extending around the periphery thereof for receiving said strip therein, a holding roll, means adjustably mounting said holding roll adjacent said backup roll, said holding roll having a rounded groove extending around the periphery thereof for receiving said strip therein, said backup roll and said holding roll being so disposed as to receive said strip therebetween, a folding roll, means mounting said folding roll adjacent said backup roll, said folding roll being angularly disposed with respect to said backup roll and being disposed at an angle with respect to said strip, said folding roll being adjustably mounted for folding over one side edge of said strip; a second substantially horizontally disposed relatively large backup roll having a rounded groove extending around the periphery thereof for receiving said strip therein, a second folding roll, means adjustably mounting said second folding roll adjacent said second backup roll to fold over the other side edge of said strip to form an overlapped closure seam, said second backup roll being offset and having an opposite direction of rotation with respect to said first backup roll to cause the path of said strip to be angularly displaced to pull together the side edges of said strip.

References Cited

UNITED STATES PATENTS

| | | | |
|---|---|---|---|
| 2,493,143 | 1/1950 | Ingels | 29—400 |
| 2,156,952 | 5/1939 | Morsing | 29—202.5 X |
| 2,195,751 | 4/1940 | Nichols et al. | 29—505 |

THOMAS H. EAGER, Primary Examiner

U.S. Cl. X.R.

29—202.5, 420.5, 505